(12) United States Patent
Kurtz

(10) Patent No.: US 6,419,786 B1
(45) Date of Patent: *Jul. 16, 2002

(54) METHOD FOR BLEACHING WOOD PULP CONTAINING RECYCLED PAPER

(75) Inventor: Rolf Kurtz, Huskvarna (SE)

(73) Assignee: Cellwood Machinery AB, Nassjo (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/230,059

(22) PCT Filed: Jul. 22, 1997

(86) PCT No.: PCT/SE97/01305

§ 371 (c)(1),
(2), (4) Date: Apr. 12, 1999

(87) PCT Pub. No.: WO98/04774

PCT Pub. Date: Feb. 5, 1998

(30) Foreign Application Priority Data

Jul. 25, 1996 (SE) .............................. 9602858

(51) Int. Cl.[7] .............................. D21C 5/02; D21C 9/10; D21B 1/32
(52) U.S. Cl. ........................ 162/4; 162/5; 162/6; 162/7; 162/18; 162/24; 162/25; 162/26; 162/56; 162/57; 162/68
(58) Field of Search .............................. 162/57, 4, 18, 162/28, 52, 246, 56, 23, 24, 25, 26, 68, 76, 78, 83, 5, 7, 6

(56) References Cited

U.S. PATENT DOCUMENTS

| 4,909,900 A | 3/1990 | Matzke et al. .................. 162/4 |
| 5,176,793 A | 1/1993 | Kurtz .............................. 162/4 |

FOREIGN PATENT DOCUMENTS

| AU | 533224 | * 11/1979 | .................. 162/18 |
| WO | WO 96/12062 | 4/1996 | |

* cited by examiner

Primary Examiner—Steve Alvo
(74) Attorney, Agent, or Firm—Sughrue Mion, PLLC

(57) ABSTRACT

A method of treating wood-fiber pump, particularly wood-fiber pulp that contains recycled paper, comprises delivering the pulp to and advancing the pulp in a heating zone while delivering steam to the heating zone. The pulp is finely-divided in a disperser and the finely-divided pulp delivered to a screw press without separate departure of steam, so as to compact the pulp in the end of the screw press and therewith form a plug seal. At the same time, one or more bleaching chemicals is or are supplied during one or more treatment stages, and the temperature of the pulp is regulated to obtain an optimal bleaching process or optimal bleaching processes. The temperature of the pulp can be raised or lowered by supplying steam or water thereto respectively. The invention also relates to a plant for carrying out the method.

9 Claims, 1 Drawing Sheet

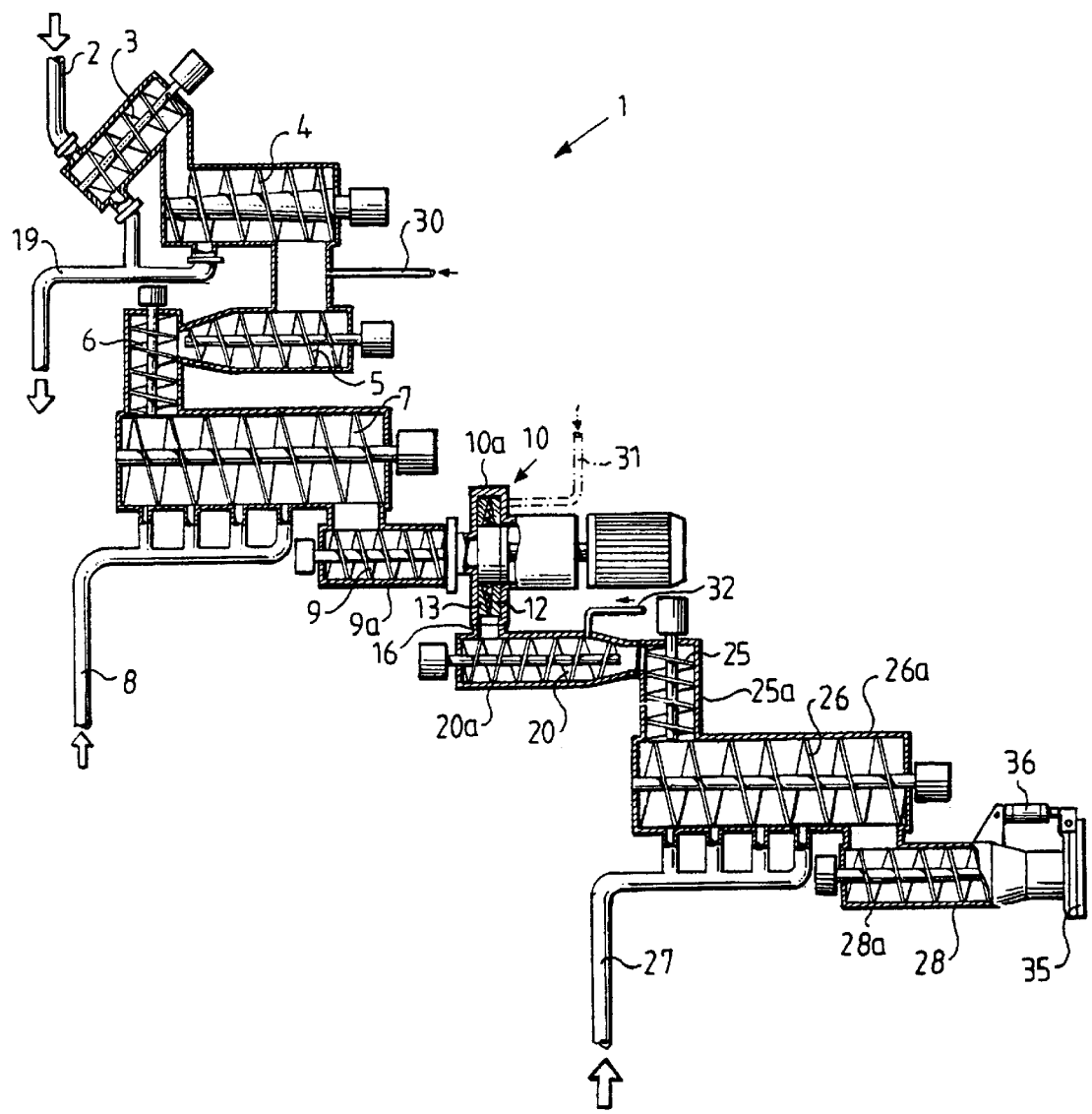

METHOD FOR BLEACHING WOOD PULP CONTAINING RECYCLED PAPER

FIELD OF INVENTION

The present invention relates to a method of the kind defined in the preamble of Claim 1 for treating wood-fibre pulp, particularly pulp that contains recycled paper.

The invention also relates to plant for carrying out the method.

Wood-fibre pulp of the kind with which the invention is concerned is treated typically in a number of stages which include dewatering of the pulp in a dewatering zone with the aid of a screw press, so as to increase pulp consistency from an input value of 4–6% to an output value of about 30%.

The pulp is then passed from the dewatering zone to a heating zone, through which the pulp is advanced while delivering steam thereto. The pulp is preferably shredded in this treatment zone, so as to enable the pulp to be heated with saturated steam to a desired temperature, both quickly and uniformly. On average, 300 kg of steam are consumed with each tonne of pulp treated.

The heated and finely-divided pulp is then passed to a disperser which enables the material to be treated mildly at high pulp consistencies. This is made possible by the mutually opposing toothed refiner discs, of which one rotates relative to the other. The disc clearance or gap can be adjusted during operation with the aid of an electro-hydraulic system.

The temperature of the treated pulp can vary from between 80° C. and 120° C. for instance, depending on the nature of the pulp being treated, among other things. There is a risk that pulp fibres will be damaged at excessively high temperatures. The pulp consistency may be as high as 30% when leaving the heating zone. Pulp consistency is reduced to some extent by the pressurized steam delivered to the pulp.

Water is normally added during the refining process to thin the pulp, and the consistency of the pulp pumped from the refiner will normally lie between 3.5 and 6%. Pulp consistency may, however, reach about 15% in some cases.

BACKGROUND OF THE INVENTION

U.S. Pat. No. 5,176,793 (Kurtz) corresponding to SE-C 461 919 (Cellwood Machinery) teaches a method of the kind defined in the preamble of Claim 1 that enables the pulp to be given a high consistency by generating in the screw press a plug which effectively seals against steam leaving the system. It has been possible to achieve pulp consistencies of 30% or more by means of this method.

The sealing plug also enables the steam temperature to be increased in the heating zone, which has particular advantages when treating highly contaminated recycled paper. It has thus been possible to utilize temperatures of 120° C. and higher. It has also been possible to increase steam pressure and therewith improve process yields.

These prior publications also describe a disperser for finely dividing dewatered and heated wood-fibre pulp. The disperser includes a rotor that carries a disc which has provided around a peripheral region teeth that coact with teeth on an opposing toothed ring or disc mounted in a surrounding housing, said ring or disc preferably being fixedly mounted and functioning to finely divide the pulp. The disperser also includes a pulp outlet. In some cases, the pulp outlet includes a connection with a screw press for advancing the pulp to an end of the press that is closed or sealed by valve means so as to form a sealing pulp-plug at said end, without separate departure of steam.

Although this known method and known plant provide very good results when treating recycled paper, they do not address the problem of bleaching recycled paper, which is often necessary. This applies both to the fibres present in the wood-fibre pulp and to the inks deriving from the print on the recycled paper. This problem is made more difficult by the fact that the bleaching chemicals used in the bleaching processes concerned require different conditions in order to achieve the best bleaching result, particularly with respect to the temperature of the pulp to be bleached. In addition, an increase in temperature, often to substantially above 100° C.—which certain chemicals require for the best result—also requires a corresponding increase in pressure.

U.S. Pat. No. 4,909,900 (Matzke, et al) teaches a bleaching method in which, subsequent to dispersion, the bleached wood-fibre pulp is delivered to a tank or container in which the bleaching method is carried out. The method thus lacks the step in which finely-divided pulp is delivered to a screw press or plug screw without separate steam departure. The object of this known method is to shorten the bleaching process to a duration of some few seconds.

WO 96/012062 (AGA) teaches a method which is characterized mainly by supplying oxygen to the process with the intention of limiting the amount of peroxide used. This known method also lacks the step of delivering the pulp to a screw press or plug screw downstream of the disperser, and the prevention of separate departure of steam.

Neither does this publication address the particular problem that is encountered when some of the bleaching chemicals relevant to the bleaching process react with oxygen and therewith lose their bleaching effect in the presence of oxygen.

OBJECTS OF THE INVENTION

An object of the present invention is to provide a method of the kind defined in the introduction that will make instaneous effective bleaching of the wood-fibre pulp possible to achieve.

Another object of the invention is to provide a method which will enable effective bleaching of pulp in conjunction with the treatment thereof, both with respect to the actual fibres in the pulp and also with respect to contaminants relating to printing inks present in the pulp.

A further object is to provide a method of the aforedescribed kind which includes a bleaching process and which is adapted to the different temperature conditions required by the various chemicals used, in order to obtain the best possible result.

Still another object of the invention is to provide a method which includes a wood-fibre pulp bleaching process and which functions effectively with the exclusion of atmospheric oxygen.

According to a second aspect, an object of the invention is to provide a treatment plant, particularly for the treatment of wood-fibre pulp that includes recycled paper, with which pulp can be bleached effectively in the absence of any essential auxiliary devices.

SUMMARY OF THE INVENTION

These and other objects are achieved with an inventive method that has the characteristic features set forth in the characterizing clause of Claim 1.

The most significant advantages afforded by the invention reside in the ability of bleaching wood-fibre pulp at temperatures higher than 100° C., by providing a sealed, pressurized system that will prevent the ingress of air. This also overcomes the serious drawback that certain chemicals have a poorer bleaching effect in the presence of air, or may even be destroyed. The invention is also beneficial from an environmental aspect, since no chemicals are able to leak from the plant while the plant is operating.

The fact that the plug formed by the screw press effectively seals the system against the departure of steam from the system, while maintaining pulp consistency, enables the temperature of the system to be controlled effectively, such temperature control being essential to the effective bleaching effect achieved when applying the invention.

The steam temperature in the heating zone may reach 120° C. or higher and is highly effective in relation to the addition of certain bleaching chemicals, which is advantageous when treating recycled paper that is highly contaminated with printing inks. Adjustment of the pressure of the steam delivered to the system can therewith contribute towards improving the yield of the treatment process.

Other bleaching chemicals require a lower temperature to achieve the best result. With this in mind, the invention enables the temperature to be reduced by supplying water of relatively low temperature to the system. This can be achieved by cooling the wood-fibre pulp with a comparatively large amount of low-temperature water in conjunction with the chemical supply, and thereafter reheating the pulp. This enables the thermal energy contained in the pulp immediately downstream of the disperser to be used in an optimal manner.

The pulp residence time in the reaction screw can be adjusted by varying the speed of the screw. It has been found in practice that in order for the bleaching chemicals used to give the best result, the pulp should have a screw residence time of longer than six minutes. A residence time of about ten minutes is usually the most effective residence time.

The bleaching chemicals may be charged to a shredder that is preceded by a preheater in the dispersing part of the plant and from there to the disperser itself and then to a screw press or to a plug screw downstream of the screw press.

The active phase of the bleaching process takes place thereafter in the bleaching section of the plant, which in one preferred embodiment of the invention commences with a shredder that disintegrates the pulp plug formed in the screw press or in the plug screw.

The major part of the bleaching process then takes place in the reaction screw where the pulp residence time is controlled with the aid of the speed at which the screw rotates, as mentioned earlier.

According to another aspect, the invention also relates to a wood-fibre pulp treatment plant, particularly wood-fibre pulp that contains recycled paper, the main characteristic features of said plant being set forth in Claim 4.

Other characteristic features of the invention and advantages afforded thereby will be apparent from the following description of a number of preferred embodiments of the invention. These embodiments are described with reference to the accompanying drawings, which illustrate the main components of an inventive treatment plant schematically and partly in section.

BRIEF DESCRIPTION OF THE DRAWING

The drawing illustrates a number of essential components of a plant for treating pulp that contains recycled paper.

DESCRIPTION OF PREFERRED EMBODIMENTS

The pulp is passed through a conduit 2 to a screw-type dewatering device 3 in which the pulp is dewatered from an input consistency of 2% to an output consistency of 8%, for instance. Water pressed from the pulp is discharged through a conduit 19.

The dewatering zone also includes a screw press 4 which operates in the dispersing system from an input consistency of from 4–6% to an output concentration of about 30%. The screw is coated with hardmetal. The screw press is designed so that all parts of the dispersing system will be readily accessible.

The pulp is then transferred to a preheater 7 in the heating zone of the plant, via a plug screw 5 and a shredder 6. Steam is introduced at different locations along the axial length of the preheater. The pressure and temperature of the steam delivered will be varied in accordance with the extent to which the pulp is contaminated, among other things.

The pulp shredder 6 disintegrates the pulp plug formed in the plug screw 5 into a particle form in which the pulp can be heated uniformly and quickly. This enables the finely-divided pulp to be heated effectively to the desired temperature, with the aid of saturated steam. The steam overpressure is controlled with the aid of appropriate valve means (not shown).

The heated pulp granules are transferred from the preheater 7 to a disperser 10, via an infeeder 9 that includes a conveyor screw 9a. The pulp granules are fed axially to a central infeed zone, via an inlet in a housing 10a.

The disperser 10 includes a rotor which is driven by an electric motor and coacts with a toothed disc 12 accommodated in the housing 10a. The teeth on the disc 12 coact with teeth on an opposing disc 13 fixedly mounted in the housing, such as to finely-divide the pulp delivered to the disperser. Dilution water is delivered to the disperser through suitable conduits (not shown).

The disperser includes an outlet 16 which connects with an inlet of a screw press or outfeed plug screw having a screw 20 mounted in a housing 20a. A pulp plug of desired pulp consistency, for instance a consistency of 30% or more, is formed in that end of the housing 20a which lies distal from the inlet.

The pulp plug functions to seal the system so that the heat content of the steam delivered to the system at overpressure and relatively high temperature, e.g. a temperature of 110–120° C., can be utilized in the most effective manner possible.

Some of the aforedescribed components are provided with bleaching chemical delivery means, e.g. conduits. These chemicals may be hydrosulphide or peroxide for effective bleaching of fibres present in the pulp. Bleaching can also be effected with oxygen gas in some cases.

Formadine sulphinic acid (FAS) may be used for full reactive bleaching of printing ink contaminants present in the pulp.

The illustrated embodiment thus includes supply means 30 connected to the vertical transport shaft between the screw press 4 and the plug screw 5, supply means 31 connected to the actual disperser 10, and supply means 32 connected to the screw press or plug screw 20.

Various types of bleaching chemicals can be delivered at these locations, or at other locations, in accordance with the properties of the wood-fibre pulp concerned.

The above description is concerned with the dispersing section of the plant. Those components located downstream of the plug screw 20 belong to the bleaching section of the plant and include a shredder 25 which extends vertically in a housing or casing 25a and which functions to disintegrate the pulp plug formed in the screw press or plug screw 20.

The disintegrated pulp is then delivered to a reaction screw 26 which is accommodated in a casing 26a and in which the major part of the bleaching process takes place. Steam is delivered to the casing 26a through a conduit 27. Alternatively, or additionally, water, e.g. water of relatively low temperature, is delivered through the conduit 27 or through a further conduit (not shown).

The residence time of the pulp in the reaction screw is controlled by the speed at which the screw rotates and will usually be about ten minutes. A further screw press or plug screw 28 accommodated in a housing or casing 28a is connected to the outfeed end of the reaction screw, said screw press or plug screw being essentially of the same kind as the screw press 20.

The screw press 28 may include a pivotally mounted valve flap 35 that is actuated by a pneumatic cylinder 36 and associated piston rod. There may also be included a valve flap regulator which causes the valve flap to exert a predetermined counterpressure against the pulp plug formed in the end of the plug screw 28. When this pressure is exceeded, the flap will open and therewith allow the pulp plug of desired pulp consistency to leave the outfeed plug screw.

The pulp plug formed in the plug screw 28 also seals the system such as to enable recovery of the heat content of the steam delivered to the system to the best extent possible.

The pulp plugs formed in the plug screws 20 and 28 also contribute towards insuring that essentially no air that is capable of influencing negatively the bleaching operation in the reaction screw 26 will enter the plant.

The arrangement of said bleaching chemical supply means 30, 31 and 32 at respective different locations in the system enables the best result to be achieved in dependence on prevailing conditions and circumstances. For instance, a plant of the type described and illustrated here will enable different types of bleaching processes to be carried out simultaneously in different sections of the plant, so-called sequence bleaching. It can also be ensured that different temperatures prevail in these different sections of the plant, so as to achieve optimal bleaching.

What is claimed is:

1. A plant for treating wood-fibre pulp that contains recycled paper, wherein the plant includes a dispersing section which sequentially comprises:
    a) a dewaterer (3);
    b) a preheating zone which includes a preheater (7) provided with a screw feeder;
    c) means (8) for delivering steam to the preheater;
    d) a disperser (10) for finely-dividing the pulp; and
    e) a screw press means or plug screw means (20) for advancing the pulp without separate departure of steam, from the disperser to compact the pulp at the end of the screw press means or plug screw means to form a system sealing plug, wherein the plant is characterized by
    f) a shredder means (25) functioning to disintegrate the sealing plug exiting from the screw press means or the plug screw means (20);
    g) a reaction screw (26);
    h) means (30; 31; 32) for delivering bleaching chemicals to one or more plant components;
    i) means (27) for delivering steam and/or water to the reaction screw (26) so as to achieve optimal temperature conditions for the bleaching process in the reaction screw; and
    j) a further screw press means (28) located downstream of the reaction screw and functioning to advance the plug without the separate departure of steam, so as to form a sealing plug in the end of said further screw press means.

2. A plant according to claim 1, characterized in that the bleaching chemical delivery means (30; 31; 32) are connected to at least one location in said plant.

3. A plant according to claim 1, characterized in that the various bleaching chemical supply means are connected to different plant components.

4. A plant according to claim 1, wherein said chemical delivery means (30; 31; 32) are connected upstream of the preheater (7), at the disperser (10), and at a downstream screw press means or plug screw means (20).

5. A plant according to claim 1, wherein said chemical delivery means (30; 31; 32) are connected upstream of the preheater (7), and at a downstream screw press means or plug screw means (20).

6. A plant according to claim 1, wherein said chemical delivery means (30; 31; 32) are connected at the disperser (10), and at a downstream screw press means or plug screw means (20).

7. A plant according to claim 1, wherein said chemical delivery means (30; 31; 32) are connected either upstream of the preheater (7), at the disperser (10), or at a downstream screw press means or plug screw means (20).

8. A plant according to claim 1, characterized in that said further screw press means (28) includes a diameter on its upstream end that is larger than a diameter on its downstream end.

9. A plant according to claim 1, characterized in that the various bleaching chemical supply means are connected to different plant components.

* * * * *